(12) United States Patent
Gao et al.

(10) Patent No.: US 12,075,778 B2
(45) Date of Patent: Sep. 3, 2024

(54) INHIBITOR FOR RESISTING MUSKMELON POWDERY MILDEW AS WELL AS PREPARATION METHOD AND APPLICATION THEREOF

(71) Applicant: Northeast Agricultural University, Harbin (CN)

(72) Inventors: Peng Gao, Harbin (CN); Taifeng Zhang, Harbin (CN); Shilun Qiao, Harbin (CN); Feishi Luan, Harbin (CN); Hongyu Liu, Harbin (CN)

(73) Assignee: NORTHEAST AGRICULTURAL UNIVERSITY, Harbin (CN)

( * ) Notice: Subject to any disclaimer, the term of this patent is extended or adjusted under 35 U.S.C. 154(b) by 0 days.

(21) Appl. No.: 18/168,100

(22) Filed: Feb. 13, 2023

(65) Prior Publication Data

US 2023/0180752 A1 Jun. 15, 2023

(30) Foreign Application Priority Data

Dec. 23, 2022 (CN) .......................... 202211662563.8

(51) Int. Cl.
*A01N 43/50* (2006.01)
*A01N 25/06* (2006.01)

(52) U.S. Cl.
CPC ............. *A01N 43/50* (2013.01); *A01N 25/06* (2013.01)

(58) Field of Classification Search
CPC ................................ A01N 43/50; A01N 25/06
See application file for complete search history.

(56) References Cited

FOREIGN PATENT DOCUMENTS

| CN | 106305745 A | * | 1/2017 | |
| CN | 106305747 A | | 1/2017 | |
| CN | 106305748 A | * | 1/2017 | |
| CN | 109964960 A | | 7/2019 | |
| WO | WO-2005094580 A1 | * | 10/2005 | ............. A01N 37/40 |
| WO | 2019023895 A1 | | 2/2019 | |

* cited by examiner

*Primary Examiner* — Johann R Richter
*Assistant Examiner* — Danielle Johnson
(74) *Attorney, Agent, or Firm* — Porus IP LLC (57) ABSTRACT

An inhibitor for resisting muskmelon powdery mildew as well as preparation method and application thereof are provided, belonging to the technical field of muskmelon culturing. In order to solve the technical problems that muskmelon powdery mildew has caused serious influence on growth and yield of muskmelon, the disclosure uses an inhibitor containing allantoin for resisting muskmelon powdery mildew to spray leaves of the muskmelon in a seedling stage or a spreading stage of the muskmelon, which effectively increases the resistance of the muskmelon to powdery mildew. The disclosure has great significance for improving the yield and quality of the muskmelon.

1 Claim, 8 Drawing Sheets

INHIBITOR FOR RESISTING MUSKMELON POWDERY MILDEW AS WELL AS PREPARATION METHOD AND APPLICATION THEREOF

TECHNICAL FIELD

The disclosure belongs to the technical field of muskmelon culturing, and particularly relates to an inhibitor for resisting muskmelon powdery mildew as well as preparation method and application thereof.

BACKGROUND

Powdery mildew, as one of the worldwide fungous diseases, has caused great production challenges and yield losses on muskmelon (*Cucumis melo* L.). Powdery mildew can infect plant tissues, including leaves, petioles, stems and tendrils. Powdery mildew has the characteristics of rapid development, rapid spread and difficult control, after the leaves are exposed to powdery mildew fungi, white disease spots will be appear at first, with the development of the powdery mildew fungi, the leaves turn yellow and wilt, which seriously affects the photosynthesis of the plant, causing the growth of the plant to be weakened, affecting the normal growth of fruits, and leading to plant death in server cases, thereby greatly reducing the yield and quality of muskmelon. The morbidity of muskmelon powdery mildew in Northeast China is serious, and the main pathogen is *Podosphaera xanthii*.

In recent years, more and more types of inhibitors for resisting plant diseases have been applied to agricultural production in China, among which allantoin has become a popular variety in the market due to its role in promoting plant growth, increasing yield, rooting and ripening. However, studies on the effect of allantoin to increase the resistance to muskmelon powdery mildew have not been reported so far.

SUMMARY

To solve the influence of muskmelon powdery mildew on the growth and yield of muskmelon, the disclosure provides an inhibitor for resisting muskmelon powdery mildew. The inhibitor is an aqueous solution containing allantoin, and as an effective ingredient, the concentration of the allantoin in the inhibitor is 700 mg/L or 1050 mg/L.

The disclosure further provides a preparation method of the inhibitor. The preparation method includes: mixing allantoin and water according to a ratio of 700 mg:1 L or 1050 mg:1 L, heating to 100° C. and stirring until the allantoin is dissolved, adding Tween 20 until the volume fraction of Tween 20 is 1%, and stirring uniformly.

The disclosure also provides application of the above inhibitor in improving resistance to powdery mildew of muskmelon.

By further defining, the application is to spray the inhibitor according to claim 1 on leaves of a muskmelon plant.

By further defining, the spraying is carried out once every three days in a spreading stage or a seedling stage of the muskmelon, and a medicament is uniformly covered on the leaves for each time of spraying.

By further defining, the spraying is to spray an allantoin aqueous solution with the concentration of 700 mg/L in the spreading stage of the muskmelon, or to spray an allantoin aqueous solution with the concentration of 1050 mg/L in the seedling stage of the muskmelon.

The disclosure also provides a method for improving resistance to powdery mildew of muskmelon, and the method includes spraying leaves of a muskmelon plant with an aqueous solution containing allantoin.

By further defining, the concentration of the allantoin is 700 mg/L or 1050 mg/L.

By further defining, the spraying is carried out once every three days in a spreading stage or a seedling stage of the muskmelon, and a medicament is uniformly covered on the leaves for each time of spraying.

By further defining, the spraying is to spray an allantoin aqueous solution with the concentration of 700 mg/L in the spreading stage of the muskmelon, or to spray an allantoin aqueous solution with the concentration of 1050 mg/L in the seedling stage of the muskmelon.

BENEFICIAL EFFECTS OF THE DISCLOSURE

According to the disclosure, by preparing the aqueous solution containing allantoin and spraying the leaves of the muskmelon in the spreading stage or the three-leaves and one-bud stage with the aqueous solution, the resistance to powdery mildew of the muskmelon is improved, and the control efficiency can reach 100%.

BRIEF DESCRIPTION OF FIGURES

FIG. 1A is the experimental group, and FIG. 1B is the negative control group;

FIG. 2A and FIG. 2C are the experimental group, and FIG. 2B and FIG. 2D are the negative control group; and FIG. 3A-3C is a plate experiment result diagram of inhibitory effect on pathogen of muskmelon gummy stem blight by allantoin aqueous solution; FIG. 3A is an allantoin aqueous solution treatment group with the concentration of 700 mg/L, FIG. 3B is an allantoin aqueous solution treatment group with the concentration of 1050 mg/L, and FIG. 3C is a sterile water treatment group.

DETAILED DESCRIPTION

In order to make the above objectives, features and advantages of the disclosure more obvious and understandable, the specific implementations of the disclosure are described in detail below in combination with the specification examples.

Many specific details are set forth in the following description in order to fully understand the disclosure, but the disclosure can also be implemented in other ways that are different from those described herein, similar extension can be made by those skilled in the art without departing from the connotation of the disclosure, and the disclosure is not limited by the specific examples disclosed below.

Furthermore, the term "an example" or "examples" used herein refers to a specific feature, structure or characteristic that can be included in at least one implementation of the disclosure. The expression "in one example" that appears in different places in the specification does not all refer to the same example, nor is a separate or selective example that is mutually exclusive with other examples.

Example 1

This example provides an inhibitor for resisting muskmelon powdery mildew, and a specific preparation method is as follows:

Allantoin and water were mixed according to a ratio of 700 mg:1 L, an obtained mixture was heated to 100° C. and stirred until the allantoin was completely dissolved, Tween 20 was added until the volume fraction of Tween 20 was 1%, and an obtained mixture was stirred uniformly, so as to obtain the inhibitor for resisting muskmelon powdery mildew.

Example 2

This example provides an inhibitor for resisting muskmelon powdery mildew, and a specific preparation method is as follows:

Allantoin and water were mixed according to a ratio of 1050 mg:1 L, an obtained mixture was heated to 100° C. and stirred until the allantoin was completely dissolved, Tween 20 was added until the volume fraction of Tween 20 was 1%, and an obtained mixture was stirred uniformly, so as to obtain the inhibitor for resisting muskmelon powdery mildew.

Example 3

This example provides application of the inhibitor for resisting muskmelon powdery mildew prepared in Example 1 in improving resistance to powdery mildew of muskmelon, which is specifically as follows:

Preparation and inoculation of pathogen spore suspension of muskmelon powdery mildew:

Muskmelon leaves with severe powdery mildew were randomly selected from the field, and conidia were transferred to a beaker containing sterile water by a brush and uniformly stirred to obtain the spore suspension of powdery mildew. Spore concentration was measured under an optical microscope by using a blood counting chamber, and the concentration of the spore suspension was adjusted to be $1\times10^6$ spores/mL for later use, which was used for inoculation tests. It was identified that this bacterial suspension was the bacterial suspension of muskmelon powdery mildew.

Figure 1A:
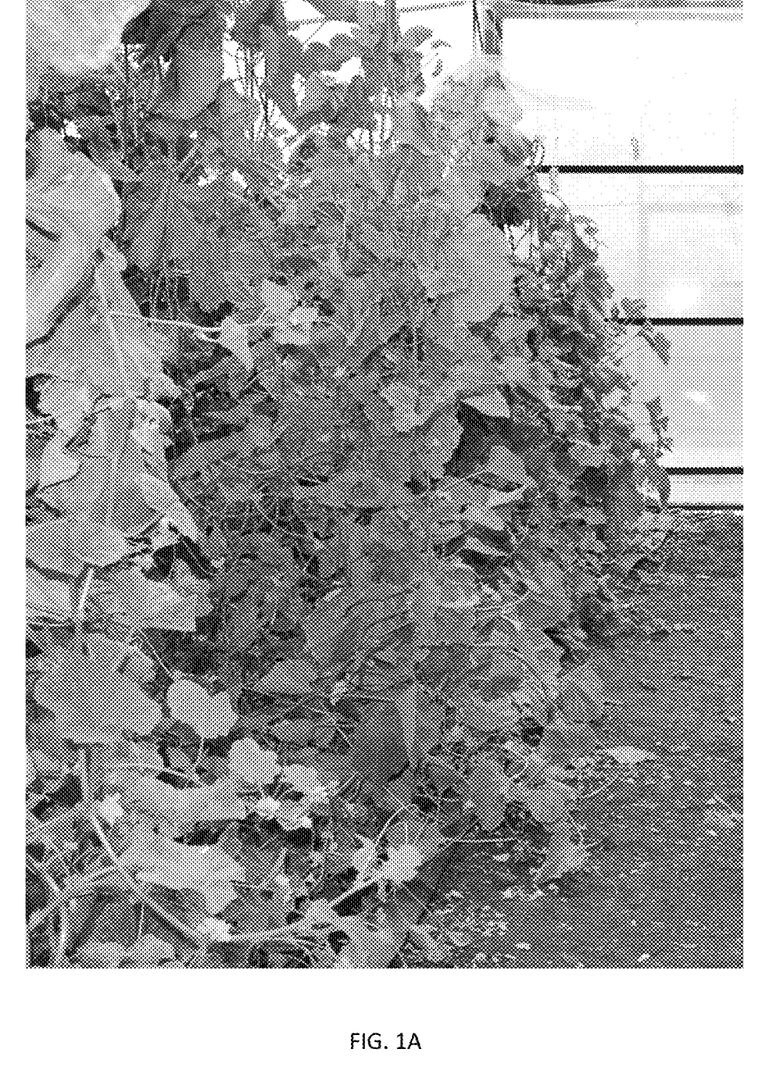
FIG. 1A-1B is an observation result diagram of resistance to powdery mildew of an experimental group and a negative control group in Example 3.
Figure 1B:
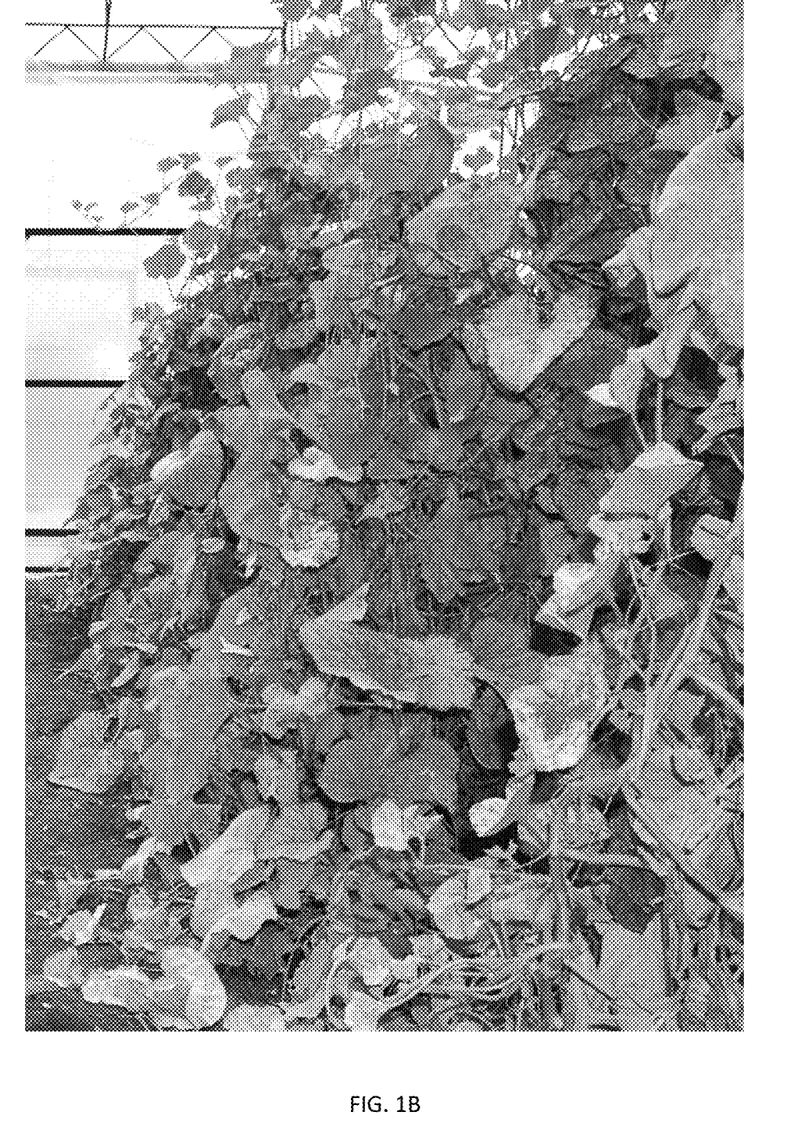

Muskmelon seedlings were planted in a greenhouse in June. When the muskmelon seedlings grown to the spreading stage, they were divided into a blank group, a pathogen inoculation group, a negative control group and an experimental group. The muskmelon leaves in the experimental group were sprayed with an aqueous solution containing allantoin with the concentration of 700 mg/L at 5:00 pm to 6:00 pm (in order to avoid evaporation of the allantoin solution caused by high temperature and long-time illumination), spraying was carried out once every three days, and a medicament was uniformly covered on the leaves for each time of spraying. The negative control group was sprayed with the sterile water at 5:00 pm to 6:00 pm, spraying was carried out once every three days, and the spraying amount of each time was the same as that of the aqueous solution containing allantoin in the experimental group. 24 hours after the first spraying of the allantoin water solution in the experimental group, the negative control group, the pathogen inoculation group and the experimental group were inoculated with the spore suspension of powdery mildew obtained above after the solution on the leaves was evaporated. After the pathogen inoculation group was infected with powdery mildew, the resistance to powdery mildew of the experimental group and the negative control group was observed (as shown in FIG. 1A-B), and the disease index, morbidity and control efficiency of the experimental group were calculated.

Leaf morphology was graded according to the response of the muskmelon leaves infected with powdery mildew. Grade 0: no infection; grade 1: no obvious infection; grade 2: mild infection; grade 3: moderate infection; grade 4: severe infection; and grade 5: whole-leaf infection.

Disease index=sum of disease grade numbers of all leaves of an individual plant/number of leaves of the individual plant×the highest disease grade of the leaves of the individual plant Morbidity=number of infected individual plants/total number of investigated individual plants×100%

Control efficiency=number of uninfected individual plants/total number of investigated individual plants×100%

It can be seen from FIG. 1B that powdery mildew spots appeared on the leaves in the negative control group, by statistics, the plant morbidity is 100%, and the disease index is 68 to 75; however, no powdery mildew spot is generated on the leaves in the allantoin experimental group, the plant morbidity is 0, the disease index is 0, and the control efficiency is 100%.

Example 4

This example provides application of the inhibitor for resisting muskmelon powdery mildew prepared in Example 2 in improving resistance to monocystic powdery mildew of muskmelon, which is specifically as follows:

Preparation and inoculation of pathogen spore suspension of muskmelon powdery mildew:

Muskmelon leaves with severe powdery mildew were randomly selected from the field, and conidia were transferred to a beaker containing sterile water by a brush and uniformly stirred to obtain the spore suspension of powdery mildew. Spore concentration was measured under an optical microscope by using a blood counting chamber, and the concentration of the spore suspension was adjusted to be $1\times10^6$ spores/mL for later use, which was used for inoculation tests. It was identified that this bacterial suspension was the bacterial suspension of muskmelon powdery mildew.

Figure 2A:
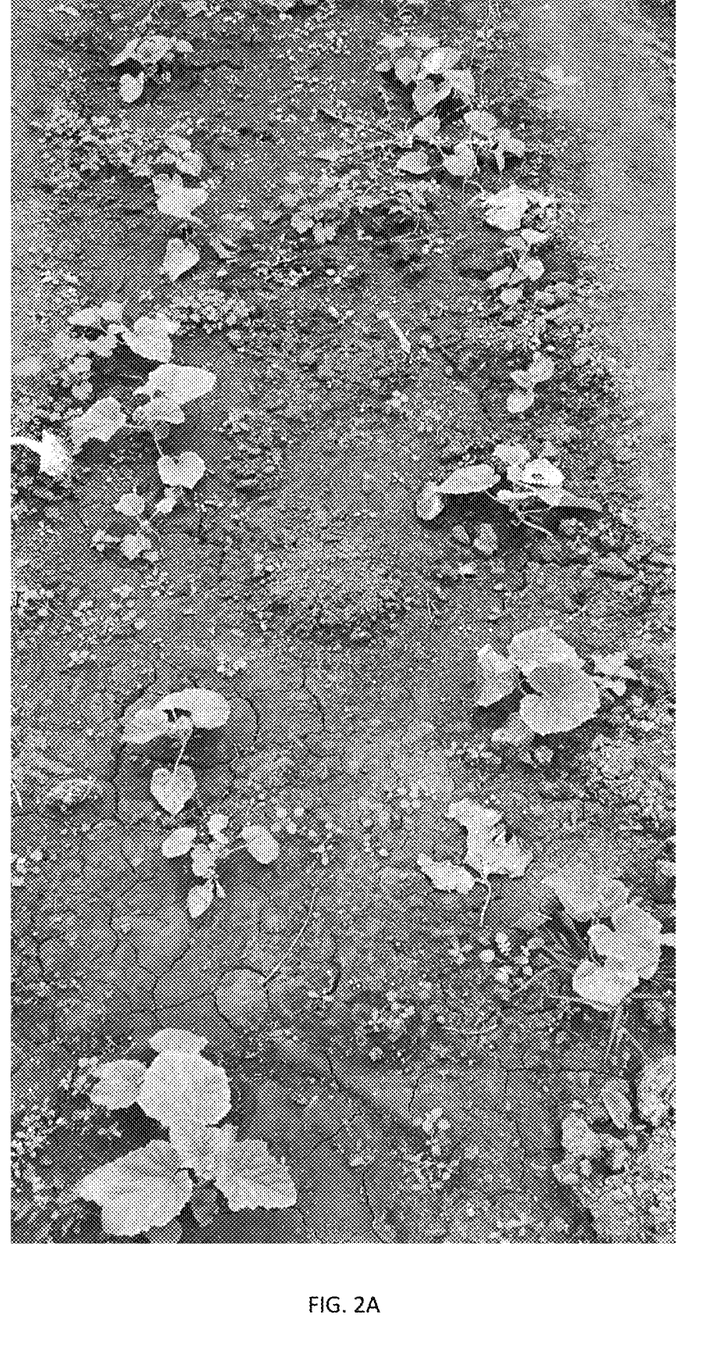
FIG. 2A-2D is an observation result diagram of resistance to powdery mildew of an experimental group and a negative control group in Example 4.
Figure 2B:
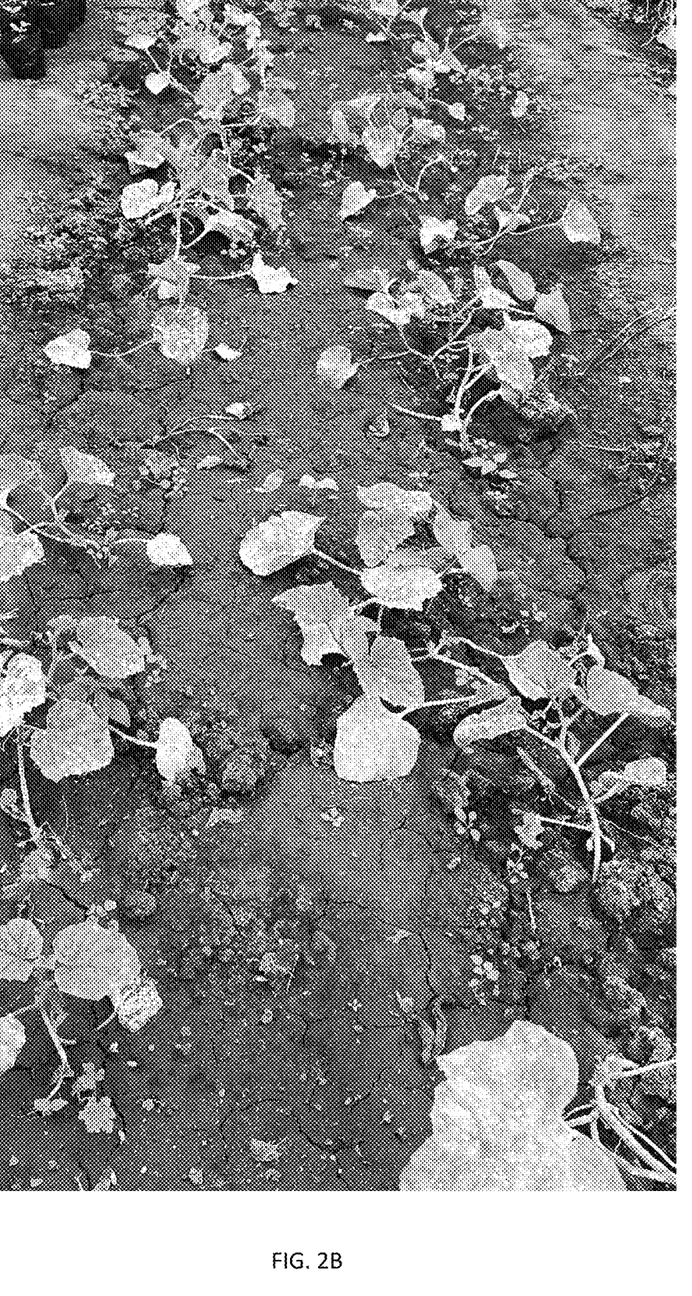
Figure 2C:
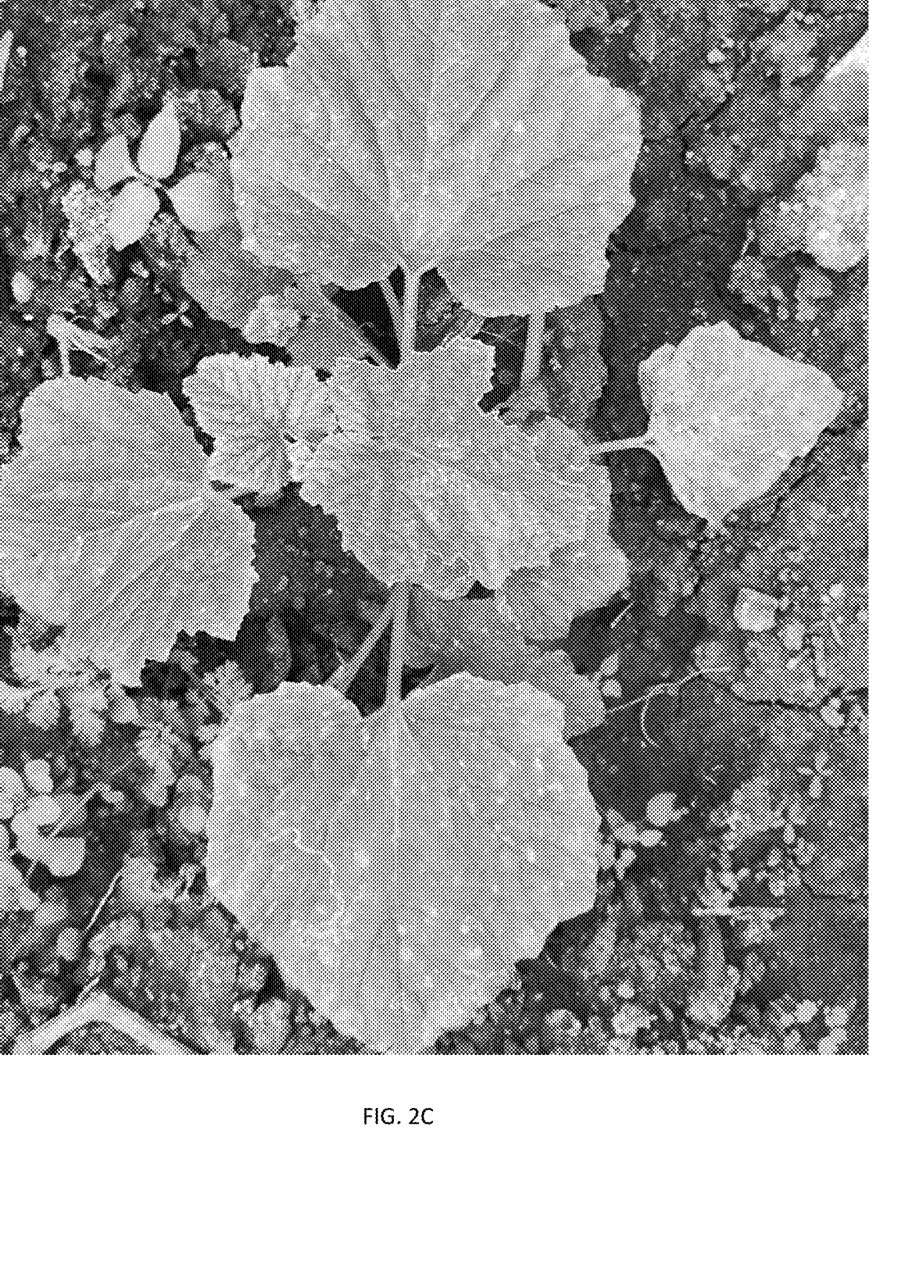
Figure 2D:
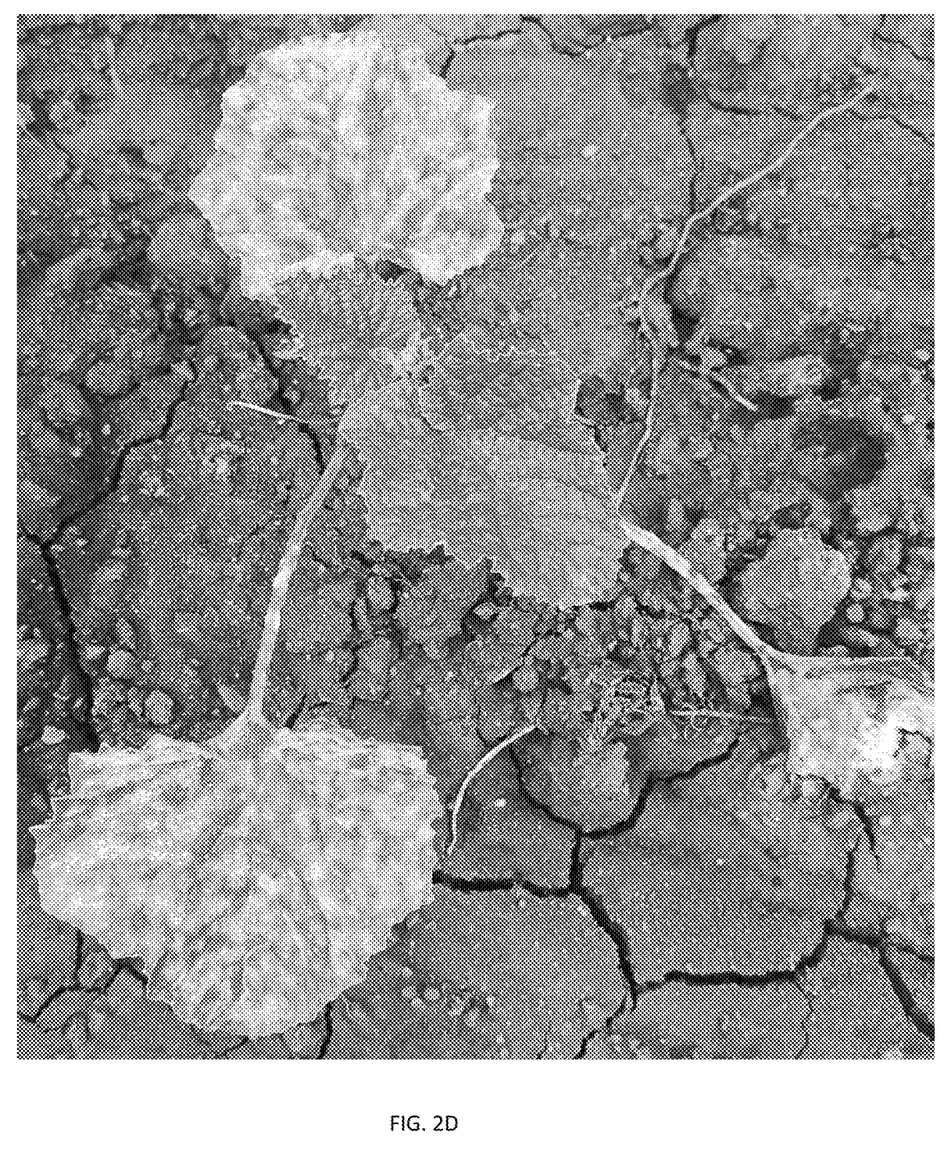

Muskmelon seedlings were planted in a greenhouse in June. When the muskmelon seedlings grown to the three-leaves and one-bud stage, they were divided into a blank group, a pathogen inoculation group, a negative control group and an experimental group. The muskmelon leaves in the experimental group were sprayed with an aqueous solution containing allantoin with the concentration of 1050 mg/L at 5:00 pm to 6:00 pm, spraying was carried out once every three days, and a medicament was uniformly covered on the leaves for each time of spraying. The negative control group was sprayed with the sterile water at 5:00 pm to 6:00 pm, spraying was carried out once every three days, and the spraying amount of each time was the same as that of the aqueous solution containing allantoin in the experimental group. 24 hours after the first spraying of the allantoin water solution in the experimental group, the negative control group, the pathogen inoculation group and the experimental group were inoculated with the spore suspension of powdery mildew obtained above after the solution on the leaves was evaporated. After the pathogen inoculation group was infected with powdery mildew, the resistance to powdery mildew of the experimental group was observed (as shown in FIG. 2A-B), and the disease index, morbidity and control efficiency of the experimental group were calculated.

Leaf morphology was graded according to the response of the muskmelon leaves infected with powdery mildew. Grade 0: no infection; grade 1: no obvious infection; grade 2: mild infection; grade 3: moderate infection; grade 4: severe infection; and grade 5: whole-leaf infection.

Disease index=sum of disease grade numbers of all leaves of an individual plant/number of leaves of the individual plant×the highest disease grade of the leaves of the individual plant Morbidity=number of infected individual plants/total number of investigated individual plants×100%

Control efficiency=number of uninfected individual plants/total number of investigated individual plants×100%

It can be seen from FIG. 2A-B that powdery mildew spots appeared on the leaves in the negative control group, by statistics, the plant morbidity is 100%, and the disease index is 60 to 75; however, no powdery mildew spot is generated on the leaves in the allantoin experimental group, the plant morbidity is 0, the disease index is 0, and the control efficiency is 100%.

Figure 3A:
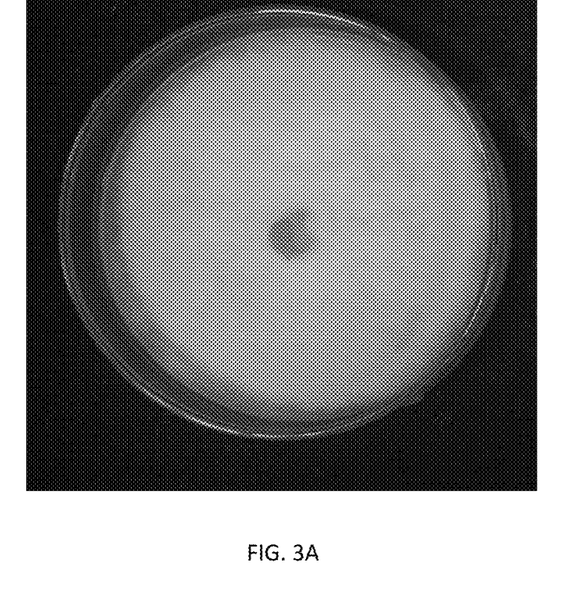
Figure 3B:
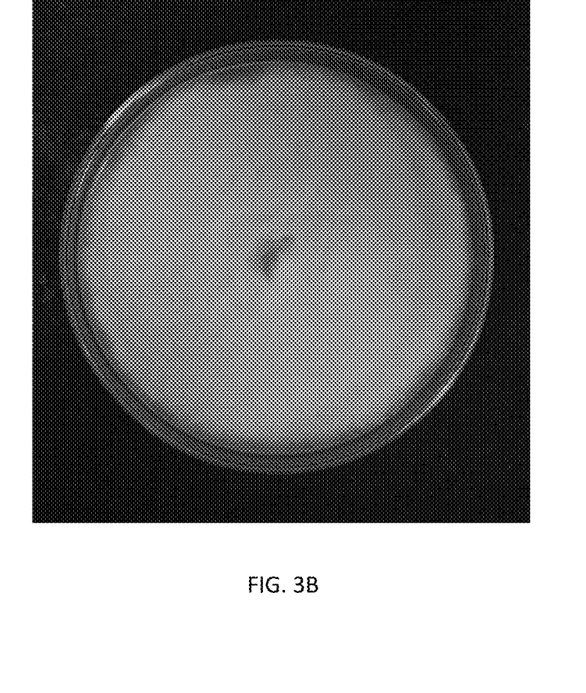
Figure 3C:
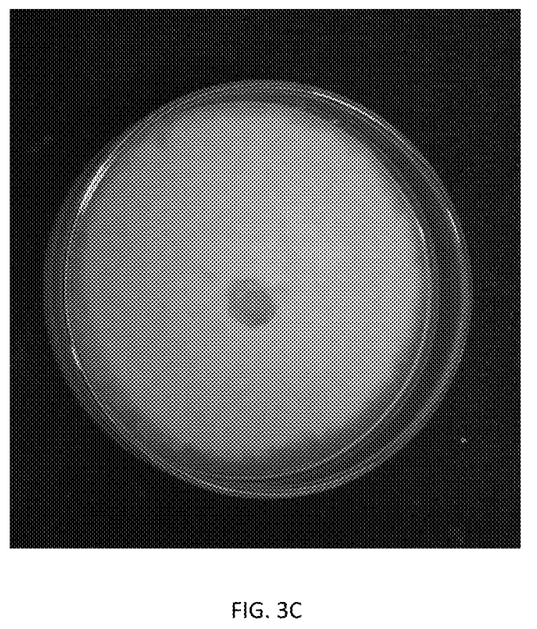

This disclosure also studies whether the inhibitor containing allantoin for resisting muskmelon powdery mildew can improve the resistance to powdery mildew of muskmelon is due to that the allantoin can directly inhibit the growth of the powdery mildew pathogen. Based on the purpose of study, the inventor designed a plate experiment. Considering that powdery mildew is a living parasitic fungi and can only grow and reproduce on living plants, a PDA medium cannot be used for culturing, so that pathogen of muskmelon gummy stem blight is used for experiment. The specific experiment method is as follows: a PDA medium was prepared and poured into plates; equal amounts of an allantoin aqueous solution with the concentration of 700 mg/L, an allantoin aqueous solution with the concentration of 1050 mg/L and sterile water were respectively smeared on three plates, and then a bacterial cake of the pathogen of muskmelon gummy stem blight was inoculated in the center of each plate; the plates were cultured for 7 days under 28° C., and the growth of the pathogen of muskmelon gummy stem blight in the three plates was observed. The results are shown in FIG. 3A-3B. It can be seen from FIG. 3A-3B that the allantoin aqueous solution does not inhibit the growth of the pathogen of muskmelon gummy stem blight, indicating that allantoin can improve the resistance to powdery mildew of the muskmelon only on living plants, and it is speculated that exogenous allantoin may regulate endogenous hormone or endogenous substances of plants to improve the resistance to powdery mildew of the muskmelon.

Although the disclosure has been disclosed above with preferred examples, it is not intended to limit the disclosure. Anyone skilled in the art can make various changes and modifications without departing from the spirit and scope of the disclosure, therefore the scope of protection of the disclosure shall be defined as in the claims.

What is claimed is:

1. A method for improving resistance to powdery mildew of muskmelon, wherein the method comprises spraying leaves of a muskmelon plant with an aqueous solution containing allantoin, wherein
    the aqueous solution does not contain other active ingredients except allantoin,
    a concentration of the allantoin in the aqueous solution is 700 mg/L or 1050 mg/L, and
    the spraying is carried out once every three days in a spreading stage of the muskmelon using the aqueous solution with the concentration of 700 mg/L or once every three days in a seedling stage of the muskmelon using the aqueous solution with the concentration of 1050 mg/L.

* * * * *